United States Patent Office 3,393,043
Patented July 16, 1968

3,393,043
METHOD AND APPARATUS FOR PRODUCING ALKALI METAL AND/OR ALKALI-EARTH METAL PHOSPHATES
Kurt Willi Harri Kribbe, deceased, late of Knapsack, near Cologne, Germany, by Gertrud Katharina Kribbe, née Hanhardt, Knapsack, near Cologne, and Heinrich Kribbe and Edith Kribbe, née Kuhrt, Brakel, near Hoxter, Germany, heirs, and Heinz Harnisch, Lovenich, near Cologne, and Joseph Cremer, Hermulheim, near Cologne, Germany, assignors to Knapsack-Griesheim Aktiengesellschaft, Knapsack, near Cologne, Germany, a corporation of Germany
Filed Feb. 4, 1964, Ser. No. 342,871
Claims priority, application Germany, Feb. 7, 1963, K 48,884
5 Claims. (Cl. 23—106)

ABSTRACT OF THE DISCLOSURE

A process for producing a member selected from the group consisting of condensed phosphates of alkali metals and alkaline earth metals by nozzle spraying at least partially in the form of solutions and suspensions in water at least one compound of the said metals selected from the group consisting of hydroxides and salts of volatile acids in a reaction zone in a phosphorus flame obtained by reacting phosphorus with a gas containing molecular oxygen, withdrawing the phosphates subsequent to the reaction in the form of a melt and removing waste gases produced by the reaction from the reaction zone.

---

Figure 1:
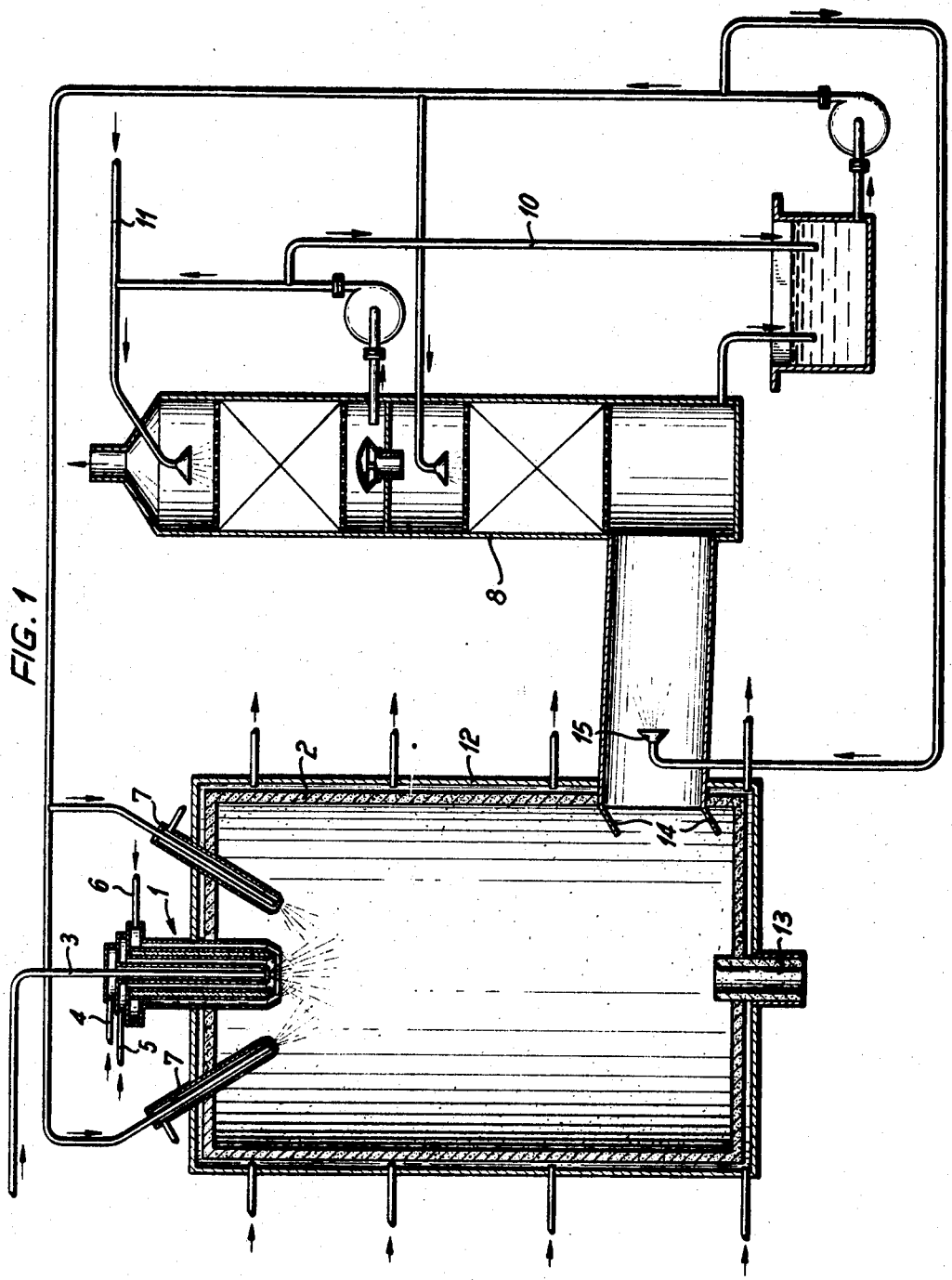

The present invention relates to a process for producing alkali metal- and/or alkaline earth metal phosphates from phosphorus, hydroxides and/or salts of the alkali metals and/or alkaline earth metals which have a volatile anion, and a gas containing free oxygen, and to an apparatus suitable for use in carrying out this process.

It is already known that alkali metal phosphates can be obtained by burning phosphorus in a reaction tower, the walls of which are sprinkled with alkali metal hydroxide or carbonate solutions which absorb and react with the phosphorus combustion products. The disadvantages involved in this process are, inter alia, that merely alkali metal carbonate or alkali metal hydroxide solutions can be used, and that the final product is obtained in the form of an aqueous solution of orthophosphates or orthophosphate mixtures, which must be processed further into solid phosphates or polyphosphates with the expenditure of additional energy.

It is also known that phosphates can be produced by reacting phosphorus, in a graphite-lined rotary kiln, in the presence of air and steam with metal salts which have a volatile anion. In this case the rotary kiln is allowed to rotate with such a speed that as a result of the centrifugal forces produced, the graphite wall is covered on all sides with a thick layer of a molten mixture of phosphate and metal salt. In order to prevent the carbon reducing the resultant phosphate, the graphite lining is simultaneously cooled, for instance by means of air, to temperatures of 1000° C. to 1100° C.

This process involves considerable difficulties for the reason that the large quantities of heat liberated, especially under high loads of the plant, are difficult to remove from the reaction chamber through the graphite wall of which merely parts are directly cooled, and for the reason that the products used as the starting material merely include solid salts which are relatively expensive. Furthermore, by the operation in a horizontal rotary kiln, the resultant phosphate melt is either contaminated by the cement binding the graphite wall or the melt comes into contact with the iron shell surrounding the graphite wall by being forced through the joints of the graphite lining, which is especially promoted by the centrifugal forces acting on the melt. In addition thereto, rotating units result in higher investment and operating expenses and are subject to considerably stronger wear than stationary units.

It has now unexpectedly been found that preferably condensed alkali metal and/or alkaline earth metal phosphates can be prepared from phosphorus, hydroxides and/or salts of alkali metals and/or alkaline earth metals which have a volatile anion and a gas containing free oxygen by atomizing the said alkali metal and/or alkaline earth metal compounds in the form of an aqueous solution or suspension in a reaction chamber, directly into or in the immediate vicinity of a flame obtained by burning phosphorus, which is preferably in the molten state, and removing the waste gases as well as the phosphates from the reaction chamber, the phosphates in the form of a melt.

The reaction components should be fed equidirectionally to the reaction zone formed by the phosphorus flame and preferably concentrically to one another, the solution or suspension to be sprayed being introduced into the reaction zone, for example, jointly with the other components which concentrically surround the said solution or suspension in the center of the nozzle.

When large quantities of solution or suspension are to be sprayed, it is not always possible to feed the entire liquid through the phosphorus combustion nozzle to the reaction zone. In such cases, additional nozzles can be used which serve to spray at least a portion of the liquid in the form of a solution or suspension toward the center of the phosphorus flame and into same. Care should however be taken to prevent the spray cones from contacting the phosphorus nozzle. For this reason, nozzles which produce a narrow spray cone are preferred. The nozzles should preferably be two-material nozzles and the liquid sprayed with compressed air and/or oxygen. For reasons of symmetry, at least two and preferably a larger number of additional nozzles should be provided.

If the starting liquids are highly concentrated solutions which have the tendency of crystallizing out in the nozzles, it is advisable to use warmed air or steam as the spraying agents. The reaction zone must be supplied with free oxygen in quantities sufficient to obtain complete oxidation of the phosphorus to the pentavalent stage.

In order to obtain a dependable, surgeless, flutter-free combustion, the phosphorus combustion nozzle should have slit widths such that the speeds of emergence of the reaction components from the nozzle are within certain limits. Thus the speed of the phosphorus should be about 0.5 to 5 meters/second, that of the solution or suspension to be sprayed about 1 to 12 meters/second, the speed of the gas used for the spraying of the liquid about 300 to 1500 meters/second and that of the gas required for the spraying and burning of the phosphorus about 50 to 350 meters/second.

Furthermore, the process of the present invention enables the wash liquids obtained in the scrubbing of the waste gases, for example in a single or multiple stage wet scrubbing operation, to be returned in the form of an aqueous solution into the reaction chamber and to be sprayed into the phosphorus flame. In all known processes in which the $P_2O_5$ produced from the combustion of phosphorus is reacted with alkali metal and/or alkaline earth metal salts, the reaction product is partially obtained in very finely divided form, since the reaction product is partially produced in the form of very fine droplets. This fine portion is, however, very difficult to deposit in the reaction chamber which it rather leaves together with the waste gas from which it can only be separated by wet scrubbing. In conventional processes, the solid must be separated from these scrubbing solutions and recovered in a separate, subsequent process which means an additional expenditure of energy and work. Furthermore, in this way pure products can only be obtained from the scrubbing solution with the proviso that hydroxides or carbonates are used as the starting material. If it is desired, however, to use for instance alkali metal chloride as the starting material, a part of the hydrogen chloride liberated during the reaction dissolves in the scrubbing solution, apart from possibly entrained unreacted alkali metal chloride, so that the scrubbing solution merely enables chloride-containing products, to be obtained, the uses of which are limited.

The present invention, however, enables all the starting materials used to be recovered in the form of a phosphate melt, and in addition thereto it is not limited to the use of alkali metal and/or alkaline earth metal hydroxides or carbonates, but may also use chlorides or other salts of readily volatile acids as the starting material. Even if up to 50% of the reaction product is carried along by the waste gas out of the reaction chamber, it is still possible completely to return the quantities of scrubbing solution obtained into the reaction chamber without excessive temperature drop therein.

The waste gases are scrubbed in scrubbing towers of known type, in either one or several stages. The solids content of the scrubbing solution in the first stage should be between 10% and 60% by weight, and preferably between 30% and 50% by weight. The solution may be more dilute in additional stages, if any. Since the evaporation of the water from the solution occurs primarily in the first stage, dilute solution coming from the following stages is continuously supplied to the first stage. Fresh water should suitably be added in the second stage.

If no caustic or salt solutions are available as starting material, solid salt in finely ground form can be suspended in the scrubbing solution and this suspension atomized. The alkali metal- and/or alkaline earth metal hydroxide and/or the salt of an alkali metal- and/or alkaline earth metal with a volatile acid used as the starting material may quite generally be dissolved or suspended in the wash coming from the wet-scrubbing operation before the said wash liquid is returned. Water or dilute phosphoric acids can be used as the wash liquid.

Another advantageous mode of executing the process of this invention consists in removing arsenic in known manner, for instance by means of $H_2S$ or $Na_2S$, from the scrubbing solution before it is returned to the reaction chamber. In this way, the arsenic content of the resultant phosphate melt can be decreased by 50% or more, which is not possible by the methods heretofore known. Aqueous alkali liquors containing 10 to 90% by weight, preferably 30 to 70% by weight, solid matter can be used as the starting material.

The process of the present invention is advantageously carried out in a reaction tower in upright position, the walls of which, over whose inner surfaces the resultant phosphate melt flows down, consist of graphite which is cooled by means of a gas, for instance air.

This cooling should be so adjusted that the inner surface of the graphite walls can be maintained at temperatures below about 900° C., and preferably below 750° C., but not lower than about 100° C. below the temperature at which the phosphate to be produced as a melt begins to flow.

The cooling of the graphite walls can be so varied or regulated that a layer of entirely or partially solidified phosphate melt less than about 20 mm., preferably 5 to 10 mm., thick be formed on the inside surfaces of such walls.

It is furthermore advantageous to allow the melt to collect as liquid phase in the lower end of the reaction chamber before it is withdrawn therefrom. The quantities of phosphate melt withdrawn should be such that the remaining liquid phase contains the production quantity of a period of time of more than 10 minutes and preferably more than 30 minutes, as equalization for any brief variations in the addition of the phosphorus or of the alkali metal and/or alkaline earth metal compounds so that a melt of constant composition flows off. In order to facilitate maintaining the molten phase liquid, it is advisable to draw off the hot waste gases in the vicinity of the liquid phase, and preferably directly above its surface, from the reaction chamber. If the heat liberated by the off-gases is insufficient to maintain the molten phase liquid, additional heating sources can be provided for this purpose.

In order to maintain the entire surface of the graphite inner wall at a temperature which is as uniform as possible, the cooling gases supplied to the graphite from the outside should be distributed in the cooling system of the graphite walls in a manner analogous to the temperature gradient in the reaction chamber.

By impregnation of the graphite with a phosphate melt at the start of the reaction, it is possible considerably to improve its resistance to oxidation so that—in contradistinction to other processes—it is not necessary to have a protective layer of liquid phosphate melt several centimeters thick flow down along the graphite inner wall. The graphite is impregnated by allowing a thinly liquid phosphate melt, produced in the reaction chamber and having an alkali metal oxide:$P_2O_5$ ratio (molar ratio) of less than 1.3, preferably less than 1.1, flow down at the start of the reaction over the inner surface of the graphite lining, the melt thereby penetrating into the pores of the graphite. During the impregnation, the pressure in the cooling system of the graphite lining should be adjusted lower than the pressure in the reaction chamber. On the other hand, during the main reaction, the pressure prevailing in the cooling system of the graphite lining should be higher than that in the reaction chamber.

The process of the present invention offers the great advantage that aqueous solutions or suspensions of alkali metal and/or alkaline earth metal hydroxides, carbonates or salts with other readily volatile acids, frequently obtained as by-products or waste products in the industry, can be used as starting material for making alkali metal and/or alkaline earth metal phosphate melts. In addition thereto, the process described above is distinguished by high space-time yields. Due to the internal cooling as a result of water evaporation, higher outputs can thus be obtained with the same size equipment. In this connection, it is surprising that large quantities of liquid may directly be sprayed into a phosphorus flame without at least a part of the phosphorus being oxidized merely up to an oxidation stage which is less than the pentavalent stage, and that despite the strong removal of energy which is caused by the evaporation of the water, the temperature in the reaction chamber does not drop to the extent that the resultant phosphate melt can no longer flow down along the walls.

Products which are contaminated by lower-valent compounds of phosphorus are extremely undesirable since, aside from the toxicity inherent to phosphorus compounds of lower oxidation stages, they display an unpleasant odor when dissolved in water.

As described above, one mode of carrying out the process of the present invention comprises using solid alkali metal and/or alkaline earth metal compounds as the starting material, dissolving or suspending same in the solutions obtained on scrubbing the off-gases with water, and spraying the resulting solutions or suspensions into a flame.

If only small quantities of scrubbing solution are available or if the solid starting material is, for example, a substance forming a hydrate of high water content, such as calcined soda, there will be obtained thickly liquid suspensions which are very difficult to convey by pumping and which are even more difficult to spray.

In order to eliminate such disadvantages, it has proved advantageous to merely spray a portion of the alkali metal and/or alkaline earth metal compounds in the form of an aqueous solution or suspension, whilst the remainder thereof should be sprayed in finely divided solid form into or in the immediate vicinity of the phosphorus flame.

To this end, the solid alkali metal and/or alkaline earth metal compounds are advantageously sprayed centrally within the phosphorus flame, whilst the solutions or suspensions are sprayed from the outside into the flame.

The solids are most advantageously atomized through a multiple material nozzle, whereas the solution or suspension should be atomized into the phosphorus flame by means of several two-material nozzles arranged concentrically around the multiple material nozzle.

The alkali metal and/or alkaline earth metal salts which have a volatile anion include the carbonates, nitrates and halides, especially chlorides, of the above metals; there may also be used, as mentioned above, the hydroxides of these alkali metals and/or alkaline earth metals.

Considerable commercial advantages are obtained by the present invention, especially in the case where the gases escaping from the reaction chamber are subjected to wet scrubbing, where the resulting liquids, if desired after the addition of solid alkali metal and/or alkaline earth metal compounds, are used as the starting material and atomized in the form of an aqueous solution or suspension into the phosphorus flame or in the immediate vicinity of the phosphorus flame. The solid portions of the alkali metal and/or alkaline earth metal compounds suspended in a current of carrier gas, for example air, are so introduced into the multiple material nozzle, preferably in a direction tangential thereto, that the resulting salt-gas mixture leaves the nozzle with a twist.

The process of the present invention thus enables to a considerably improved extent the useful application of dilute, aqueous solutions of alkali metal and/or alkaline earth metal hydroxides or carbonates or salts of these metals with volatile acids, solutions which are often obtained in industry and the concentration of which would be uneconomical due to the energy costs involved.

The apparatus suitable for use in carrying out the process of the present invention comprises a stationary, preferably cylindrical reaction tower having a phosphorus combustion nozzle designed as a multi-material nozzle and disposed at the upper end portion of the reaction tower, whose walls which are vertical or deviate only slightly from the vertical, consist of graphite seamless joined together and provided with bores or channels which serve to guide cooling gas.

The graphite tower is optionally provided with a shell which practically should not come into contact with the outer wall of the graphite, so that an intermediate space for improved guidance of the cooling gases is formed between the graphite and the shell.

The dimensions of the reaction chamber are also of great importance since firstly the temperature of the wall must not become too high, while secondly the temperature even in the bottom portion of the reaction tower must still be sufficiently high so that the resultant melt can flow off in readily fluid form. For this reason, it has proven advantageous so to select the dimensions of the tower that the ratio of the height to diameter of the reaction chamber is between about 2:1 and 5:1 and preferably about 3:1.

It is furthermore advisable to subdivide the cooling system into a plurality of horizontal cooling zones located one above the other and spaced from one another, which can be fed with different quantities of cooling gas, depending on the temperature gradient in the reaction chamber. The graphite walls may consist of structural elements, such as blocks, plates or segments, connected together in seamless fashion without the use of a binder or cement.

If phosphates having an alkali metal oxide/$P_2O_5$ ratio of $\leq 1.2$ are produced, it is advisable further to increase the degree of separation by inserts in the lower portion, that is to say approximately in the lower third, of the reaction tower. These inserts, which may be pipes, bars, plates, blocks and the like, in addition to increasing the surface, effect a multiple deflection of the stream of gas and advantageously consist—as well as the structural elements of the graphite walls themselves—of electrolytic graphite which has been after-compressed in accordance with known methods.

While the inserts most frequently cannot be cooled, their resistance to oxidation can be substantially increased by impregnating them in the same manner as the graphite walls, at the start of the reaction; that is to say they should be made of graphite impregnated with a phosphate melt.

The reaction tower has upper feed pipes for supplying the starting components and lower outlet pipes for removing the resulting reaction products.

The phosphate melt outlet is an overflow pipe, which is disposed in the bottom portion of the reaction tower and may be designed variable in height so as to enable the quantity of the molten sump to be regulated. The upper feed pipe is advantageously a multiple material nozzle. In addition to this centrally located multiple material nozzle there are provided several nozzles, for example two-material nozzles, which are disposed concentrically around the multiple material nozzle and the lower ends of which are directed toward the reaction zone, these additonal nozzles being fed through a cycle line, for example with the scrubbing liquid withdrawn at the bottom portion of the wash tower for the reaction off-gases.

An exemplary embodiment of the apparatus according to this invention which, however, need not obligatorily be used in carrying out the present process is shown diagrammatically in the accompanying drawings. As shown in FIG. 1, a reaction chamber is surrounded by graphite walls 2 which are provided with bores and channels (not shown) forming a cooling system. To improve the flow of the cooling gases, the graphite walls may be surrounded by a jacket 12 which does not contact the graphite walls and thus forms an intermediate space with them.

The upper end of this reaction tower carries a multiple-material nozzle 1 in which, for instance, the liquid phosphorus fed through line 5 is sprayed by means of compressed air from line 6. The liquid serving as starting material is fed through line 3 to the center of this nozzle and also atomized by means of air fed through line 4. The resultant phosphate melt leaves the tower through the outlet 13 developed as a dam and is quenched in known manner. The lower opening of the tower is dimensioned firstly so as to obviate the danger of clogging, and secondly so as to obviate the aspiration of excessive amount of leakage air which would unnecessarily increase the amount of off-gas. Both the dam and the melt outlet are also made of graphite material which is impregnated with melt and preferably after-compacted. An off-gas pipe which leads to a scrubbing tower 8 is provided with baffle plates 14 and at least one nozzle 15 spraying scrubbing liquid into the off-gas having a temperature of about 500° C. to 900° C.

By evaporation of water from the scrubbing liquid, the off-gas is cooled down to a temperature of 100° C. or less. The off-gas so cooled is then caused to flow into the two-stage or multi-stage scrubbing tower 8 of known type in which the entrained product and the excess $P_2O_5$ are scrubbed out. The scrubbing liquid is recycled by a pump, and thereby gradually concentrated. The concentrated phosphate solution can be removed from the cycle and sprayed through lines 9 and the two-material nozzles 7 into the reaction chamber, if desired after the concentration of the solution has been slightly reduced by a more dilute solution supplied through line 10. The necessary fresh water is introduced into the cycle at 11.

Figure 2:
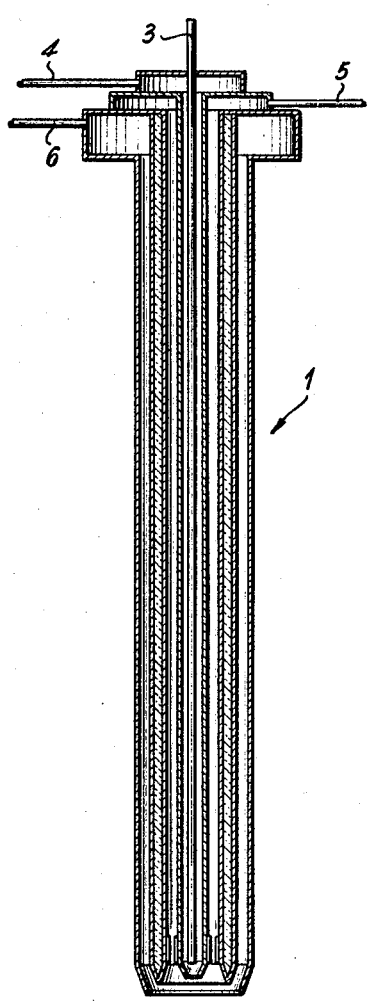

FIG. 2 represents the multiple-material nozzle 1 with the aforementioned feed lines 3, 4, 5 and 6 in greater detail.

The following examples serve to illustrate the invention:

Example 1

100 liters, corresponding to about 170 kg. molten phosphorus were burned per hour in an installation provided with a reaction tower 6 meters high and 2 meters wide. 265 liters 50% caustic soda solution were sprayed per hour with 70 cubic meters air centrally through the multiple-material nozzle into the phosphorus flame. The total quantity of combustion air was between 1000 and 1200 cubic meters per hour. 370 kg. phosphate were obtained per hour in the form of a melt, corresponding to a yield of about 68%. The phosphite content of the product was 0.005%. The balance was obtained in the form of a 50% aqueous solution which, after suitable adjustment with a further proportion of caustic soda solution, was processed into sodium pyrophosphate. 128 kg. Na-pyrophosphate per hour were obtained. The total yield of $P_2O_5$ was 97%.

Example 2

In the same installation as that used in Example 1, 170 kg. phosphorus were burned per hour with a total quantity of air of about 1200 cubic meters per hour. Through the center of the nozzle, 430 liters 50% caustic soda solution at 70° C. were sprayed per hour into the flame by means of 80 cubic meters per hour of air. 560 kg. melt per hour were obtained. The yield of melt was 88% and the phosphite content was less than 0.01%. The balance was obtained as 50% solution which was processed into sodium pyrophosphate in the manner described in Example 1. The total yield, referred to $P_2O_5$, was 98%.

Example 3

In the same installation as that used in Examples 1 and 2, 170 kg. per hour of phosphorus were burned. Through the central nozzle, 350 liters of 50% caustic soda solution per hour were sprayed into the flame by means of 70 cubic meters per hour of air. After three hours of operation, the solids content of the scrubbing solution in the first stage of the wet scrubbing had increased to 45%. 350 liters of this solution were then sprayed per hour through 3 nozzles arranged concentrically around the phosphorus nozzle into the reaction tower by means of 100 cubic meters per hour of compressed air each. From the second stage of the wet scrubbing, sufficient solution was added into the first cycle so that the level and the solids content remained constant. The second cycle was constantly supplemented with fresh water. 580 kilograms of melt containing less than 0.01% phosphite per hour were obtained, corresponding to a yield of about 98%.

Example 4

In the same installation as that used in the preceding examples, 100 liters per hour, corresponding to 170 kilograms per hour of phosphorus were burned with about 1000 cubic meters per hour of air. 420 kg./hr. of finely ground KCl were suspended in 330 liters per hour of the solution containing about 30% solids obtained from the first cycle of the wet scrubbing and sprayed into the phosphorus flame by means of a metering pump while being distributed over the central nozzle and the three outer nozzles. The portion allotted to the central nozzle was sprayed with 80 cubic meters per hour of oxygen; the three outer nozzles were each charged with 150 cubic meters per hour of air. The solids content of the solution in the first stage of the wet scrubbing was maintained at about 30% by continuous feeding of solution from the second cycle. 630 kg. of melt per hour were obtained, corresponding to a yield of 97%. The chloride content of the product was 0.2% and the phosphite content less than 0.01%.

Example 5

200 kg./hr. liquid phosphorus were burned to prepare a phosphate melt, and 510 kg./hr. anhydrous soda (98% strength) suspended in 100 cubic meters/hr. air were blown through one nozzle into the flame. At the same time, about 300 liters/hr. scrubbing solution coming from the wet scrubbing stage series-connected with the reaction tower, were atomized into the flame through three two-material nozzles, arranged concentrically around the phosphorus nozzle. The solution contained, per liter, 235 grams $P_2O_5$ and 150 grams $Na_2O$. 750 kg./hr., corresponding to a yield of 99%, of the desired product were obtained.

Example 6

160 kg./hr. liquid phosphorus were burned to prepare a molten phosphate. 365 kg./hr. (about 98% strength) suspended in 80 m.³/hr. oxygen were blown into the phosphorus flame in the manner set forth in Example 1. At the same time, about 400 liters/hr. scrubbing solution were sprayed into the phosphorus flame through three outer nozzles. The scrubbing solution came from the series-connected wet scrubbing stage which in this example was charged with a dilute phosphoric acid of about 23% strength to replace the water, about 330 liters of the acid being fed per hour. The scrubbing solution contained, per liter, 560 grams $P_2O_5$ and 150 grams $Na_2O$. 675 kg./hr., corresponding to a yield of about 98%, desired product were obtained. About 20% of the $P_2O_5$ contained in the product derived from the dilute phosphoric acid.

We claim:

1. In the production of alkali metal phosphates by introducing an alkali metal compound into a flame of phosphorus burning in a gas containing molecular oxygen, the improvement according to which at least a portion of the alkali metal compound is introduced in the form of a dispersion in liquid water.

2. The combination of claim 1 in which non-gaseous combustion products are settled out, the gaseous combustion products are scrubbed with an aqueous liquid medium to trap phosphorus-containing combustion products that do not settle out, and the used scrubbing medium is introduced into the flame.

3. The combination of claim 2 in which the used scrubbing medium is dearsenized before it is introduced into the flame.

4. The combination of claim 1 in which the alkali metal compound is a chloride.

5. The combination of claim 1 in which part of the alkali metal compound is introduced into the flame in water-free condition, and part as a dispersion in water, the first part being introduced into the flame inside a downwardly directed hollow spray of burning phosphorus, and the second part being sprayed into the burning phosphorus from around the periphery of the hollow spray.

References Cited

UNITED STATES PATENTS

| | | | |
|---|---|---|---|
| 3,023,083 | 2/1962 | Rodis et al. | 23—107 |
| 3,081,150 | 3/1963 | Beltz et al. | 23—106 |
| 3,168,373 | 2/1965 | Hartlapp et al. | 23—106 |

OSCAR R. VERTIZ, *Primary Examiner.*

O. F. CRUTCHFIELD, L. A. MARSH,
*Assistant Examiners.*